United States Patent [19]

Iwasaki

[11] 4,414,855
[45] Nov. 15, 1983

[54] TORQUE SENSOR

[75] Inventor: Shinichiro Iwasaki, Troy, Mich.

[73] Assignee: Aisin Seiki Kabushiki Kaisha, Kariya, Japan

[21] Appl. No.: 268,890

[22] Filed: Jun. 1, 1981

[51] Int. Cl.³ .............................................. G01L 3/10
[52] U.S. Cl. ............................ 73/862.36; 73/DIG. 2; 324/209
[58] Field of Search ................ 73/779, 862.36, 862.69, 73/DIG. 2; 324/209

[56] References Cited

U.S. PATENT DOCUMENTS

| | | | |
|---|---|---|---|
| 2,557,393 | 6/1951 | Rifenbergh | 73/862.36 |
| 2,867,118 | 1/1959 | Cavanagh | 73/DIG. 2 |
| 3,501,950 | 3/1970 | Hohenberg | 73/862.36 |
| 3,861,206 | 1/1975 | Kawafune et al. | 324/209 X |

FOREIGN PATENT DOCUMENTS

| | | | |
|---|---|---|---|
| 1900194 | 7/1970 | Fed. Rep. of Germany | 73/862.36 |
| 649972 | 2/1979 | U.S.S.R. | 73/862.36 |

OTHER PUBLICATIONS

Mohri et al., "New Force Transducers Using Amorphous Ribbon Cores", IEEE Transactions on Magnetics, vol. Mag-14, No. 5, Sep. 1978, pp. 1071-1075.
R. A. Beth & W. W. Meeks; "Magnetic Measurement of Torque in a Rotating Shaft;" The Review of Scientific Instruments; vol. 25, No. 6, Jun. 1954 pp. 603-607.
O. Dahle; "Pressductor and Torductor—Two Heavy-Duty Transducers;" IEEE Int. Conference on Non-linear Magnetics, Apr. 1963.

*Primary Examiner*—Charles A. Ruehl
*Attorney, Agent, or Firm*—Oblon, Fisher, Spivak, McClelland & Maier

[57] ABSTRACT

A torque sensor device for sensing the torque applied to a drive shaft and for producing an electrical signal representative of the applied torque. The sensor includes a non-magnetic drive shaft having a magnetic layer affixed to its outer surface. The magnetic permeability of the magnetic layer changes due to torque applied to the shaft. The permeability of the magnetic layer is detected and converted to an electrical signal representative of the torque applied to the drive shaft. The magnetic layer takes the form of one or more elongated ribbons of magnetic material helically wound about the surface of the drive shaft. Alternatively, the magnetic layer is formed from a plurality of segments of magnetic material affixed to the periphery of the shaft. Magnetically soft amorphous metal material is preferably used to form the magnetic layer.

2 Claims, 16 Drawing Figures

TORQUE SENSOR

BACKGROUND OF THE INVENTION

1. Field of the Invention

The present invention relates to a novel torque sensor device and more particularly to a novel torque sensor device which detects the torque applied to a rotating shaft and converts the detected torque into an electrical signal.

2. Description of the Prior Art

It is well known that various magnetic properties of magnetic materials change due to applied stress. In particular, the permeability of the magnetic material tends to increase due to tensile stress and tends to decrease due to compressive stress. This is mathematically expressed as follows:

$$\mu = K_1 + K_2 \sigma \quad (1)$$

where:
- $\mu$ = permeability
- $K_1$ = constant
- $K_2$ = constant
- $\sigma$ = applied stress In the unstressed condition $\sigma$ is equal to zero and thus $\mu$ is equal to the constant $K_1$ which is the normal unstressed permeability of the magnetic material. When a stress $\sigma$ is applied, the permeability is changed from $K_1$ by a factor $K_2 \sigma$. Thus, the permeability of the magnetic material is directly proportional to the applied stress.

Figure 1:
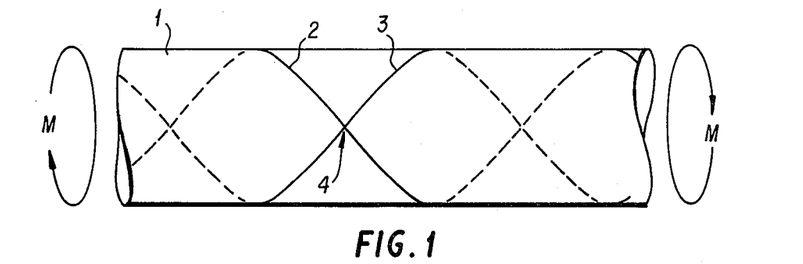
FIG. 1 illustrates various stresses occurring within a cylindrical rod due to applied torque.

When a torsional stress is applied to a cylindrical rod, each element in the rod is subjected ro a shearing stress. BETH and MEEKS in their article "Magnetic Measurement Of Torque In A Rotating Shaft" (The Review of Scientific Instruments, Vol. 25, no. 6, June, 1954) describe an analysis of the effects of torsional stress in a magnetic cylinder. It was determined that the shearing stress applied to any single element in the cylinder could be expressed in terms of a tensile stress and an equal perpendicular compressive stress. The magnitude of each stress is directly proportional to the distance between the axis of the cylinder and the single element in question. Further, it was determined that, when considering the cylinder as a whole, the directions of maximum tension and compression occur along 45° left and 45° right-handed helices about the axis of the cylinder as illustrated in FIG. 1 wherein a cylindrical rod 1 is shown as being subjected to a torque M. Helical line 2 represents the direction of compressive stress occurring along the surface of the cylindrical rod while helical line 3 represents the direction of tensile stress. Reference numeral 4 represents a typical element of the cylindrical rod 1. Element 4 is thus clearly subjected to a compressive stress along helical line 2 and a tensile stress along helical line 3; helical lines 2 and 3 being mutually perpendicular. In a cylindrical rod made of magnetic material, the effect of the torque M is to increase the magnetic permeability in directions parallel to helical line 3 and correspondingly to decrease the magnetic permeability in directions parallel to helical line 2.

Prior art torque sensors have utilized the above principles to determine changes in the permeability of a magnetic rod or drive shaft subjected to torque. This has been accomplished in one such prior art device by applying a magnetic field to the magnetic rod and detecting changes, due to torque applied to the rod, in the induced EMF occurring in various pick-up coils located adjacent to the rod.

While such prior art devices are capable of determining the amount of applied torque, they are not without significant drawbacks. For example, in a practical application where the magnetic rod acts as a drive shaft, in order to withstand the mechanical effects of the applied torque, the magnetic rod must be made from physically strong materials which may not be desirable from a magnetic standpoint. Further, typical forged drive shafts are inherently anisotropic due to inherent stresses and crystal orientations occurring within the shaft. This results in variations in the magnetic permeability of the drive shaft at various points in the shaft. Since the stress due to applied torque varies directly with distance from the axis of the drive shaft, magnetic sensors placed adjacent to the shaft are influenced both by the effects of anisotropy along the surface and in the interior of the shaft thereby providing many sources of essentially unpredictable error. Also, since each element in the drive shaft is simultaneously subjected to a tensile stress and a mutually perpendicular compressive stress, the magnetic sensors must be carefully positioned so as to be able to distinguish between the effects of both types of stress.

The present invention provides an electromagnetic torque sensor which overcomes these and other problems associated with prior art devices.

SUMMARY OF THE INVENTION

Accordingly, one object of the present invention is to provide a novel torque sensor device which is highly sensitive to changes in the applied torque.

Another object is to provide a novel torque sensor device wherein no compromise must be made between material strength and magnetic properties.

Still another object is to provide a novel torque sensor device which is not affected by inconsistancies within the portion of the device subject to the applied torque.

These and other objectives are achieved in the present invention by providing a new and improved torque sensor device wherein a non-magnetic cylindrical rod is utilized as a drive shaft coupled between a source of torque and a load. The non-magnetic cylindrical rod includes a layer of magnetic material rigidly affixed to its outer periphery. The magnetic material takes the form of at least one elongated ribbon of magnetic material wrapped about the periphery of the non-magnetic cylindrical rod and rigidly attached thereto by an adhesive means. The elongated ribbon is wrapped in a helical manner at a 45 degree angle with respect to the longitudinal axis of the rod. Alternatively, several parallel ribbons may be wrapped to form parallel 45 degree helices about the periphery of the rod; or a single ribbon may be broken into a plurality of segments, with each segment located along a 45 degree helical line on the periphery of the rod. In each of these embodiments, one or more electrical pick-up coils are positioned in close proximity to the periphery of the cylindrical rod to detect changes in the permeability of the magnetic ribbon caused by-stresses produced in the cylindrical rod due to torque applied to the rod. Electronic processor means, coupled to the pick-up coils, are utilized to produce a voltage signal proportional to the applied torque.

As discussed above with respect to FIG. 1, each element in a cylindrical magnetic rod under torque is subjected to equal compressive and tensile stresses acting along mutually perpendicular helical paths. By replacing the magnetic rod with a non-magnetic rod having a magnetic layer affixed to its surface according to the present invention, all portions of the magnetic layer are located equally distant from the longitudinal axis of the rod and thus are exposed to the same magnitude of stress. Additionally, problems existing in the prior art due to material strength in relation to magnetic properties are eliminated. Also, problems existing in the prior art caused by inconsistancies in forged magnetic rods are eliminated.

In the present invention, the magnetic layer in the form of a magnetic ribbon is wrapped to follow a helical path about the cylindrical rod. Ideally the ribbon should be infinitely long as compared to its width. Practically, a length to width ratio of ten to one or better is sufficient to produce good results. The effect of the use of the long magnetic ribbon wrapped in a helical path is that the permeability of the magnetic ribbon is affected primarily by stress due to applied torque acting along or parallel to a single helical path (as along helical path 2 of FIG. 1) and is minimally affected by mutually perpendicular stresses. Thus the permeability of the magnetic ribbon is much more sensitive to applied torque. Additionally, sources of error existing in the prior art devices are eliminated.

Although the magnetic layer of the present invention may be made from various magnetic materials, it is preferably made from a magnetically soft amorphous metal material. Since magnetically soft amorphous metal materials must be manufactured by quenching from a liquid phase metal, they are formed as a thin sheet. The materials magnetically exhibit ferromagnetism and have a high level of magnetic saturation, high permeability ($\mu_{max} > 10^3$) and a low level of a coercive force ($< 1.0$ Oe) while mechanically exhibiting a very high break strength and an excellent resiliency and stability, and provide a lesser change in characteristics under temperature variations than do semiconductor devices. Some magnetically soft materials are described in Hasegawa et al., "Soft Magnetic Properties of Metallic Glasses—Recent Developments," J. Appl. Phys. 50(3), March, 1979, pp. 1551–1556. Magnetically soft materials are sold under the trademark METGLAS (TM) by Allied Chemical Corp.

Such properties of a magnetically soft amorphous metal material are very preferred for use in the torque sensor of the present invention. Its use advantageously facilitates signal processing and increases the accuracy in the determination of the value of torque. In addition, with respect to mechanical aspects, the manufacturing is simplified while providing a higher durability and a reduced susceptibility to the influence of temperature variations.

The change in permeability in the magnetic layer in the surface of the non-magnetic cylindrical rod is sensed by one or more pick-up coils located adjacent to the rod. These coils are generally cylindrical in shape and thus the inductance of each coil is represented by the following relationship:

$$L = \frac{\pi \mu N^2 a^2}{l} \tag{2}$$

where:
$\mu$ = permeability of core

N = number of turns in coil
a = radius of coil
l = length of coil

Thus, for a given pick-up coil, the inductance of the coil is directly proportional to the permeability of the core material (magnetic layer) located within the coil. Since as discussed above, the permeability of a magnetic material is directly proportional to the stress applied thereto, it is clearly apparent that the inductance of a coil surrounding a magnetic core is directly proportional to the stress applied to the magnetic core. Thus the stress applied to the cylindrical rod including the magnetic layer thereon of the present invention may be determined by detecting the inductance of the adjacently positioned pick-up coils.

Figure 2:
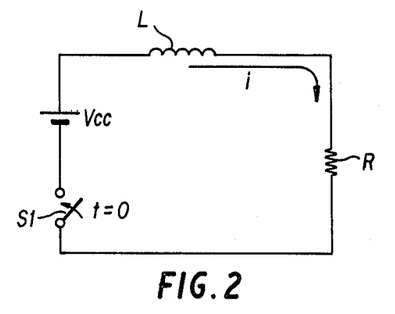
FIG. 2 illustrates a basic prior art circuit element utilized in the present invention.

The inductance of the pick-up coils is determined in the present invention by means of an electronic processor coupled to the coils. FIG. 2 illustrates very simply the principles of the electronic processor. In the circuit of FIG. 2, an inductor L and a resistor R are connected in series with a DC power source Vcc and a switch S1. If at time t=o the switch S1 is closed, the current i which flows in the circuit is represented by the following relationship:

$$i = \frac{V_{cc}}{R}\left[1 - e^{\frac{-Rt}{L}}\right] \tag{3}$$

Thus, the current i is an exponentially rising function having a time constant directly proportional to the inductance L. This circuit forms the basis of the electronic processor of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
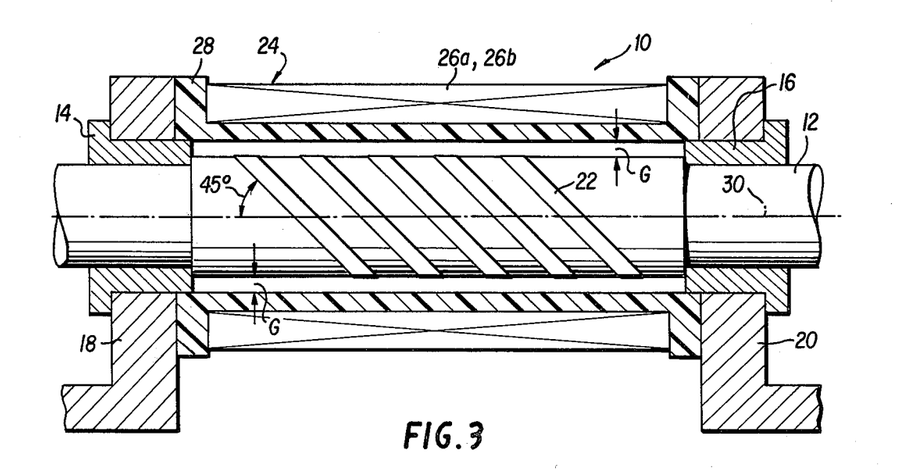
FIG. 3 illustrates a first preferred embodiment of a torque sensor according to the present invention.

Referring now to the drawings, wherein like reference numerals designate identical or corresponding parts throughout the several views, and more particularly to FIG. 3 thereof, a first preferred embodiment of a torque sensor according to the present invention is illustrated in cross section. The torque sensor, generally designated by reference numeral 10 includes a drive shaft 12 rotatably mounted within a pair of bearings 14 and 16. The drive shaft 12 is made from non-magnetic material such as stainless steel, aluminum, plastic, or other such material. The shaft is coupled between a source of torque and a load (not illustrated) and thus must have sufficient mechanical strength to withstand the applied torque. Bearings 14 and 16 can be made from any non-magnetic material suitable for use with the particular drive shaft material utilized. Bearings 14 and 16 are supported by non-magnetic support members 18 and 20, respectively in any well known manner.

Wound about drive shaft 12 is a ribbon 22 of magnetic material. The magnetic material is preferably magnetically soft amorphous metal material as described above. The ribbon 22 is wound at a 45 degree angle to the longitudinal axis 30 of the drive shaft 12 to form a plurality of helical turns. The ribbon 22 is rigidly bonded to the shaft 12 by means of adhesives such as epoxy, by braising, or by other suitable means. The bonding agent must be sufficiently rigid so as to be capable of transmitting torsional stresses occurring within the drive shaft 12 to the magnetic ribbon 22.

The torque sensor further includes a coil assembly 24 positioned concentrically with respect to the drive shaft 12. The coil assembly 24 includes two pick-up coils 26a and 26b which are bifilar wound about a cylindrical bobbin 28 having a longitudinal axis colinear with the longitudinal axis 30 of drive shaft 12. The bobbin 28 is made from epoxy glass or other suitable non-magnetic insulating material and is of standard design. The bobbin 28 is supported by support members 18 and 20 and is sized such that its interior surface is spaced by a distance G from the periphery of the drive shaft 12 as shown.

In a typical practical embodiment, an approximately 40 cm length of ribbon 22 of magnetically soft amorphous metal material was wound about a 15 cm long section of a 5 cm diameter drive shaft 12 to form approximately 5 helical turns. The ribbon was approximately 3 mm wide and 5 microns thick. Bonding was achieved by means of epoxy resin. The coil assembly 24 was formed by approximately 300 bifilar wound turns about bobbin 28. The gap G was approximately 1 mm.

Figure 4:
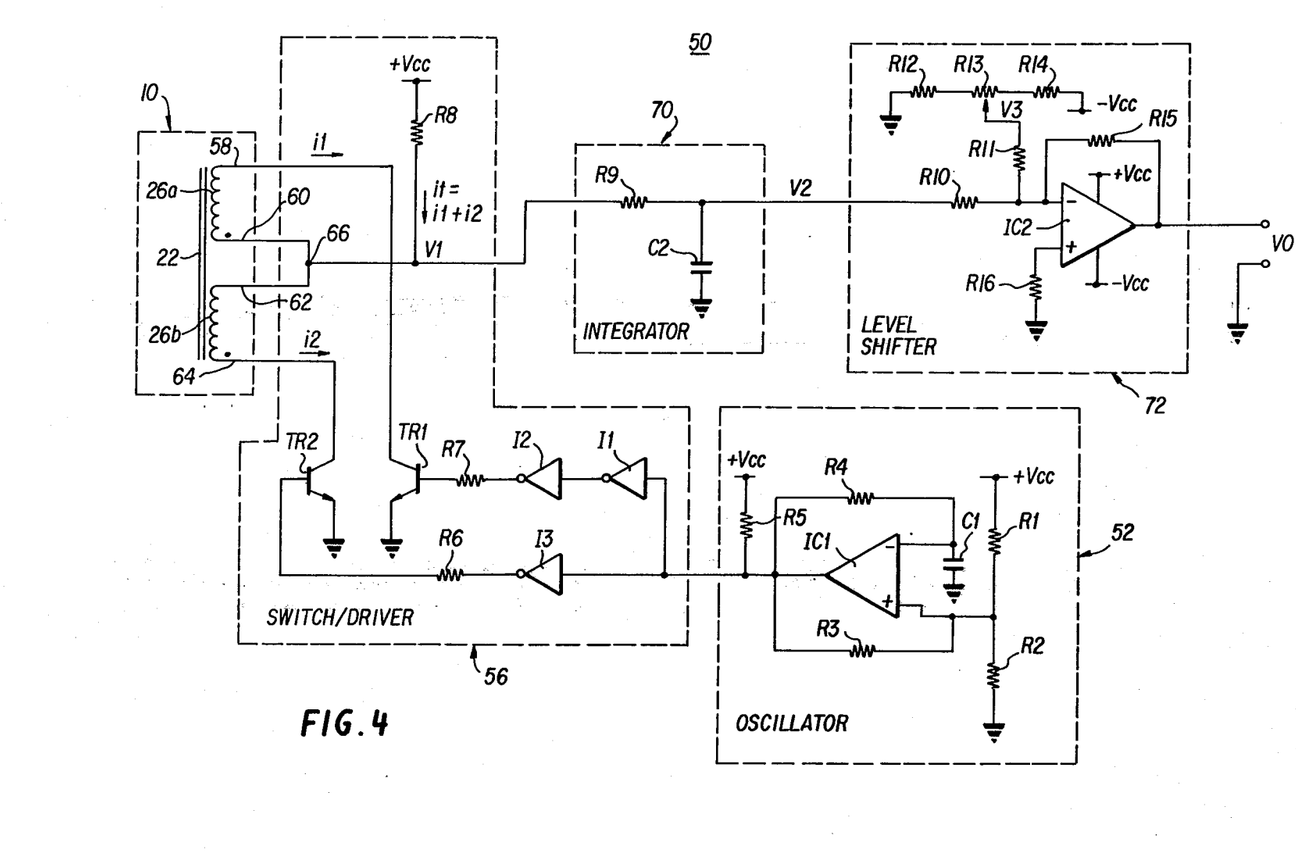
FIG. 4 illustrates an electronic processor circuit used in conjunction with the torque sensor shown in FIG. 3.

FIG. 4 illustrates a preferred embodiment of an electronic processing circuit 50 utilized in conjunction with the torque sensor 10 shown in FIG. 3. The processing circuit 50 includes an oscillator circuit 52 which produces a square wave output pulse train 54 having a frequency lying in the range of 20 to 50 kHz. Oscillator 52 is of a well known design and includes an operational amplifier ICI which may be of any standard type such as the common 741 series. The frequency of the oscillator 52 is controlled by the time constant product R4C1. The output pulse train 54 of the oscillator 52 is fed to the input of a switch/driver circuit 56 which produces drive signals for the pick-up coils 26a and 26b or torque sensor 10. In the switch/driver circuit 56, the oscillator output pulse train 54 is coupled through a series connected pair of inverters I1 and I2 to the base of transistor TR1. The inverters act to buffer pulse train 54 thereby providing isolation between the transistor TR1 and the oscillator 52. Additionally, the oscillator output pulse train 54 is coupled through an inverter I3 to the base of transistor TR2. The inverter I3 acts to invert pulse train 54 and to provide isolation between the transistor TR2 and the oscillator 52. Series resistors R7 and R6 are coupled in the base circuits of transistors TR1 and TR2, respectively, to limit the current flowing into the bases of these transistors. Thus connected, transistor TR1 is turned on and transistor TR2 is turned off when the pulse train signal 54 is at a high level. Similarly, transistor TR1 is turned off and transistor TR2 is turned on when the pulse train signal 54 is at a low level. Thus the switch/driver circuit 56 takes the form of a push-pull or differential driver circuit.

The collector of transistor TR1 is coupled to a terminal 58 of pick-up coil 26a and the collector of transistor TR2 is coupled to a terminal 64 of pick-up coil 26b. The terminals 60 and 62 of pick-up coils 26a and 26b, respectively, are joined at a junction 66. A series resistor R8 is coupled between the junction 66 and a source of positive DC voltage Vcc. Thus when transistor TR1 is turned on, a collector current i1 begins to flow through the series combination of resistor R8, pick-up coil 26a, and transistor TR1 as shown. Similarly, when the transistor TR2 is turned on, a collector current i2 begins to flow through the series combination of resistor R8, pick-up coil 26b, and transistor TR2. Assuming that transistors TR1 and TR2 are saturated when they are turned on and further that their collector to emitter voltages are negligible when they are turned on, the following equations for i1 and i2 apply:

$$i1 = \frac{Vcc}{R8}\left[1 - e^{\frac{-R8t}{La}}\right] \quad (4)$$

$$i2 = \frac{Vcc}{R8} - \left[1 - e^{\frac{-R8t}{Lb}}\right] \quad (4)$$

wherein:
La is the inductance of pick-up coil 26a; and
Lb is the inductance of pick-up coil 26b.

The total current (it) flowing through the series resistor R8 is, of course, the sum of currents i1 and i2, assuming that no other low-impedance devices are coupled to the junction 66.

FIGS. 5A through 5F illustrate various current and voltage waveforms occurring in the processing circuit 50 plotted as a function of time. In each of these FIGURES, the solid lines represent the normal condition where no torque is applied to the drive shaft 12. The broken lines indicate the detection of a positive or tensile stress in the drive shaft 12 and the chain lines indicate the detection of a negative or compressive stress in the drive shaft 12.

Figure 5A:
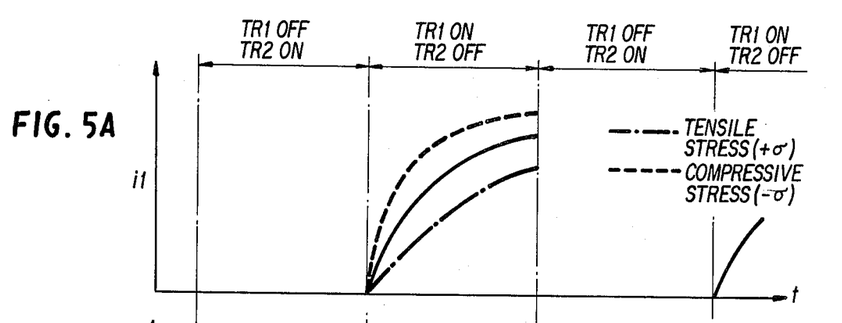
FIGS. 5A through 5F illustrate various currents and voltages occurring within the electronic processor of FIG. 4 plotted as a function of time.
Figure 5B:
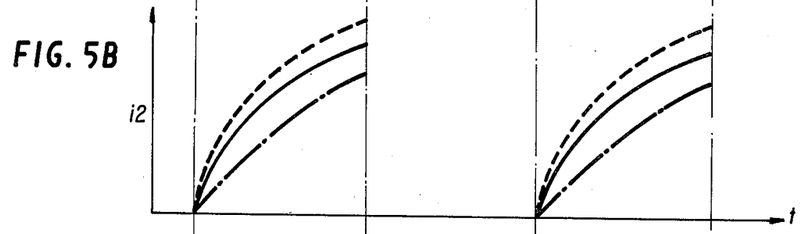
Figure 5C:
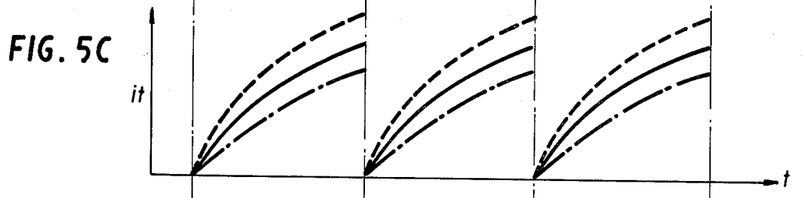

FIGS. 5A and 5B illustrate the current waveforms for collector currents i1 and i2, respectively. FIG. 5C illustrates the waveform of the total current it flowing through the series resistor R8. In each of these FIGURES it should be noted that the currents rise exponentially as mathematically predicted in equations (4) and (5) above. Further, it should be noted that the time constant of each waveform is directly proportional to the inductance of the appropriate pick-up coil (La, Lb) or directly proportional to the stress as described above.

Figure 5D:
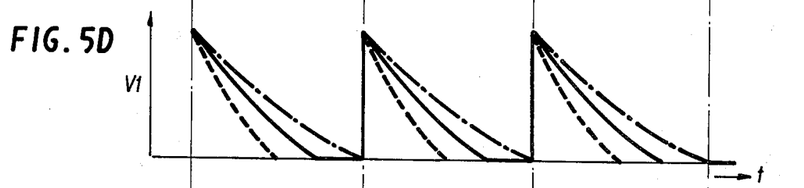

Returning to FIG. 4, the total current it passing through the series resistor R8 produces a voltage V1 at junction 66 as illustrated in FIG. 5D. As with the current waveforms illustrated in FIGS. 5A through 5C, the time constant of the voltage waveform V1 is directly proportional to the inductance of the appropriate pick-up coil or to the strain applied to the drive shaft 12.

Figure 5E:
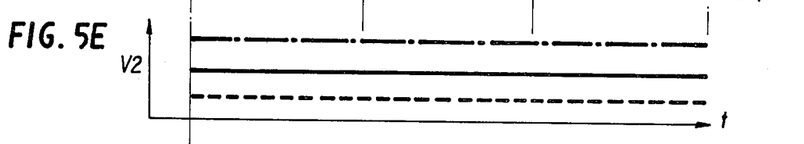
Figure 6A:
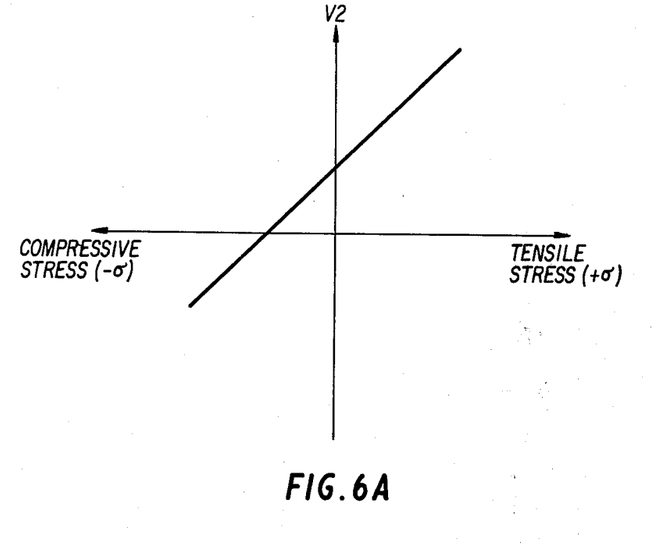
FIGS. 6A and 6B illustrate various voltages occurring within the electronic processor circuit shown in FIG. 4 plotted as a function of stress.

Junction 66 of the switch/driver circuit 56 is coupled to the input of an integrator circuit 70 as shown in FIG. 4. The integrator 70 is a simple passive circuit which includes a series resistor R9 and an integrating capacitor C2. The voltage V1 appearing at the junction 66 is thus integrated by the integrator 70 to produce an integrated voltage V2 appearing across the integrating capacitor C2. The waveform of the voltage V2 is illustrated in FIG. 5E. Since the voltage V2 is proportional to the area under the waveform of the voltage V1 as shown in FIG. 5D, the waveform of the voltage V2 varies directly in proportion to the inductance of the appropriate pick-up coil or to the stress applied to the drive shaft 12. This is further clarified by FIG. 6A wherein the voltage V2 is plotted as a function of the stress occurring within the drive shaft 12. It should be noted from both FIGS. 5E and 6A that the voltage V2 takes on a non-zero level when no stress occurs within the drive shaft 12. This non-zero voltage level is produced by the inductances La and Lb of the pick-up coils 26a and 26b, respectively, which have a non-zero normal value when no torque is applied to the drive shaft 12.

Figure 5F:
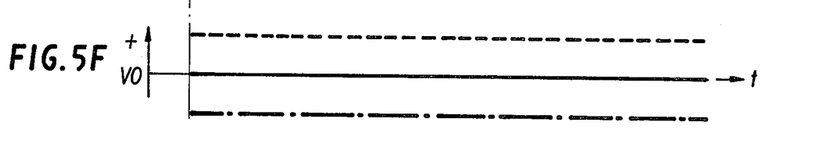
Figure 6B:
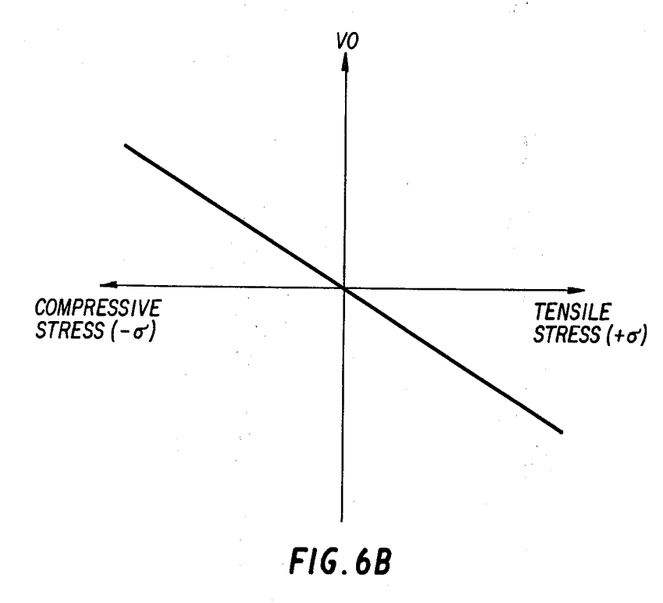

In the processing circuit 50 shown in FIG. 4, the integrator output voltage V2 is coupled to the input of a level shifter circuit 72. The level shifter circuit 72 includes an operational amplifier IC2 connected to operate as an inverting-summing amplifier. The operational amplifier IC2 may be any standard type device such as one of the common 741 series. The integrator output voltage V2 is coupled to the input of the operational amplifier IC2 by means of a series resistor R10. Resistors R12, R13, and R14 are coupled between a source of negative DC voltage −Vcc and ground to form a voltage divider which produces a negative DC voltage V3. The negative DC voltage V3 is coupled to the input of the operational amplifier IC2 via series resistor R11 where it is algebraically added to the integrator output signal V2. The resistor R13 is variable and thus is utilized to set the desired level of the negative DC voltage V3. The negative voltage V3 is set such that the algebraic sum of the signal V2 and the voltage V3 is zero at the input of the operation amplifier IC2 when no stress occurs within the drive shaft 12. The level shifter 72 produces an output voltage Vo which is proportional to the inverted algebraic sum of voltages V2 and V3 and forms the output of the torque sensor. The waveform of the output voltage signal Vo is illustrated in FIG. 5F as a function of time. FIG. 6B illustrates the output voltage Vo plotted as a function of the stress occurring within the drive shaft 12. From these FIGURES it can be seen that the output signal Vo is proportional to the stress within the drive shaft 12 and thus represents the torque applied to the drive shaft.

Figure 7A:
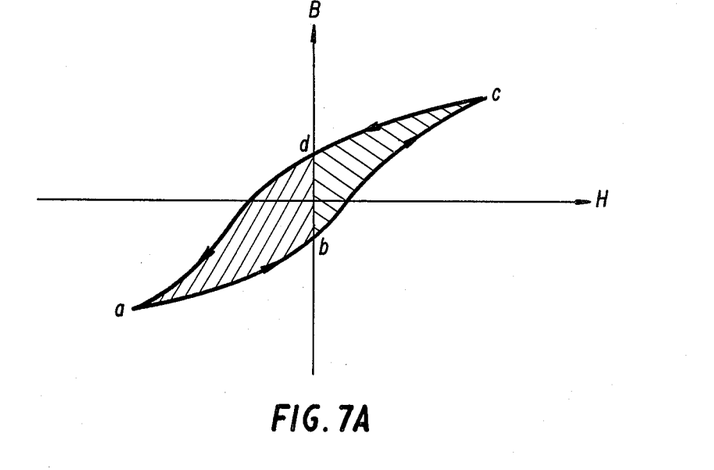
FIGS. 7A and 7B illustrate magnetization curves associated with the torque sensor of the present invention.

FIG. 7A illustrates a magnetization curve for the magnetic ribbon 22 of the torque sensor 10 shown in FIG. 3. In the electronic processor circuit 50 shown in FIG. 4, current i1 flows through the pick-up coil 26a in a direction opposite to that of the current i2 flowing through the pick-up coil 26b. The magnetic ribbon 22 is thus energized in opposite directions by the currents i1 and i2. Thus in FIG. 7a, the portion of the curve bounded by a-b-d is produced by current i1 while the portion of the curve bounded by b-c-d is produced by the current i2. The magnetic ribbon 22 is thus energized differentially by the two currents i1 and i2.

Figure 7B:
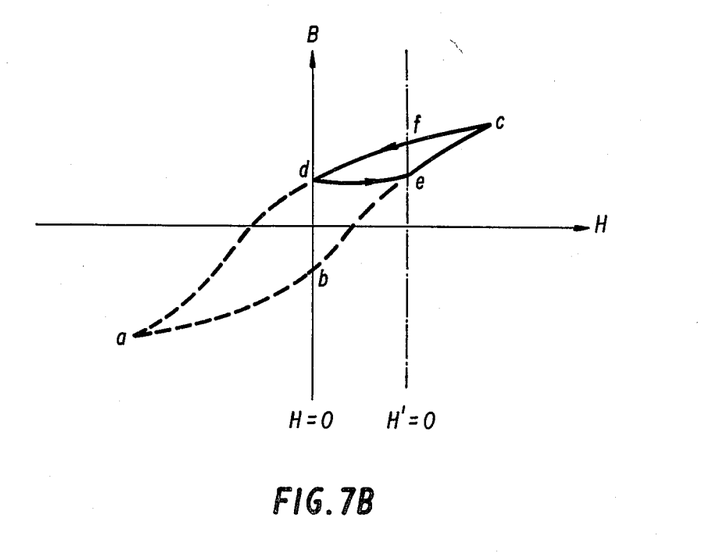

The torque sensor 10 and its associated electronic processor circuit 50 could be somewhat simplified by eliminating the pick-up coil 26b and its associated driver circuitry including transistor TR2, resistor R6, and inverter I3. FIG. 7B illustrates how the magnetization curve for the magnetic ribbon 22 would be changed for this modified circuit. The single current i1 flowing through the single pick-up coil 26a would produce a curve bounded by d-e-c-f in FIG. 7B. Thus the modification would obviously reduce the amplitude of the output voltage Vo by a factor of 2. The modified device would accurately detect the torque within the drive shaft 12 under conditions where no stray external magnetic field is present. However, in the presence of a stray magnetic field the vertical axis would shift, for example from H=0 to H′=0 as shown by the broken vertical axis in FIG. 7B. This shift would cause the output of the device to become biased by effectively altering the zero torque output of the torque sensor and thus would act to introduce error into the torque measurement. The two-coil, differential drive system of the present invention acts to eliminate errors due to stray magnetic fields by cancelling the effects thereof. For example, if a stray magnetic field were applied to the device shown in FIGS. 3 and 4, current i1 would become:

$$i1' = i1 - \Delta i \qquad (6)$$

and current i2 would become:

$$i2' = i1 + \Delta i \qquad (7)$$

wherein:
  i1 and i2 represent the currents in the absence of a stray magnetic field; and
  Δi represents the effect of a stray magnetic field.
The total current (it) is:

$$it = i1' + i2' \qquad (8)$$

or, by substituting equations (6) and (7):

$$it = i1 + i2 \qquad (9)$$

Thus the differential driver system of the present invention acts to cancel the effects of external magnetic fields.

It is desirable that the magnetic ribbon 22 cover as much of the surface of the drive shaft 12 as possible in order to maximize the output of the torque sensor. As discussed above with respect to the torque sensor of FIG. 3, the magnetic ribbon 22 is wound about the drive shaft 12 to form an angle of 45 degrees with the longitudinal axis 30 of the drive shaft. The 45 degree angle limitation acts to limit the minimum spacing between the turns of the magnetic ribbon wrapping about the drive shaft. Therefore, it is not possible to increase the coverage of the drive shaft with magnetic material using a single ribbon.

Figure 8:
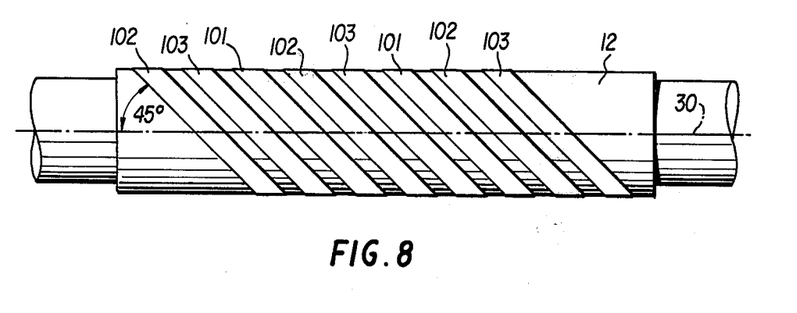
FIG. 8 illustrates a second preferred embodiment of a torque sensor according to the present invention.

FIG. 8 illustrates a second preferred embodiment of the torque sensor 10 of the present invention. FIG. 8 illustrates only the drive shaft 12 and its associated magnetic covering, the remaining components of the torque sensor being identical to those shown in FIG. 3. In this embodiment three parallel ribbons of magnetic material 101, 102 and 103 are helically wound about the drive shaft 12 at a 45 degree angle with respect to the longitudinal axis of the shaft to form three parallel windings. The use of three parallel magnetic ribbons allows a greater portion of the surface of the drive shaft to be covered while maintaining the desired 45 degree angle. The magnetic ribbons can be formed from numerous materials; however, as previously discussed, magnetically soft amorphous metal materials are preferably utilized. Although only three parallel ribbons have been illustrated herein, the use of additional ribbons is possible in light of the teachings of the present invention.

Figure 9:
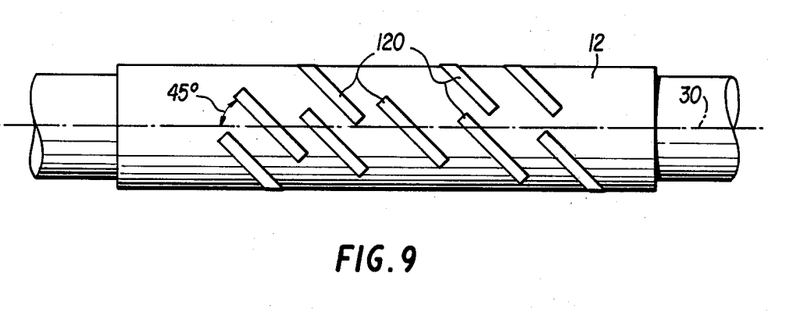
FIG. 9 illustrates a third preferred embodiment of a torque sensor according to the present invention.

FIG. 9 illustrates a third preferred embodiment of the torque sensor 10 according to the present invention. As with the embodiment illustrated in FIG. 8, only the drive shaft 12 and its associated magnetic layer are illustrated, the remaining portions of the torque sensor being the same as those shown in FIG. 3. In this embodiment, the periphery of the drive shaft 12 is covered with a plurality of elongated segments 120 made of magnetic material. The segments 120 are located along or parallel to helical lines (not shown) and are each oriented at a 45 degree angle with respect to the longitudinal axis 30 of the shaft. As in the embodiments of FIGS. 3 and 8, each segment is rigidly bonded to the surface of the shaft. For satisfactory operation, each segment should have a length to width ratio of 10 to 1 or greater as previously discussed. The advantage of the use of the magnetic segments 120 is that the spacing between the segments in the axial direction may be made much closer than permitted in either of the previously discussed embodiments. Additionally, the drive shaft illustrated in FIG. 9 is much simpler to manufacture than the previously described drive shafts. Numerous magnetic materials may be utilized to form the magnetic segments 120; however, as previously discussed, magnetically soft amorphous metal materials are preferred.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A torque sensor, comprising:
   a non-magnetic drive shaft coupled between a source of torque and a load, said drive shaft including a cylindrical outer surface;
   a thin magnetically soft amorphous metal material affixed to said cylindrical surface of said drive shaft;
   first and second cylindrical pick-up coils, each having a longitudinal axis which is colinear with the longitudinal axis of said drive shaft;
   first electronic switch means coupled in series with a source of DC power and said first pick-up coil for controlling the flow of a first current through said first pick-up coil, said first current being proportional to the permeability of said amorphous material;
   second electronic switch means coupled in series with said DC power source and said second pick-up coil for controlling the flow of a second current through said second pick-up coil, said second current being proportional to the permeability of said amorphous material;
   oscillator means, connected to said first electronic switch means and said second electronic switch means, for generating an AC switching signal to control said first and second electronic switch means;
   integrator circuit means, coupled to said first and second pick-up coils, for integrating said first and second currents;
   level shifter current means, coupled to said integrator circuit means, for generating an output signal proportional to the stress of said drive shaft whereby the torque applied to said drive shaft is represented, said output signal having a zero level in the absence of applied torque to said drive shaft.

2. The torque sensor as recited in claim 1 wherein:
   said amorphous material is formed by wrapping a thin elongated ribbon thereof about said cylindrical surface of said drive shaft, said ribbon forming a helical winding about said cylindrical surface, each turn of said helical winding being positioned at a 45 degree angle with respect to the longitudinal axis of said drive shaft.

* * * * *

UNITED STATES PATENT AND TRADEMARK OFFICE
CERTIFICATE OF CORRECTION

PATENT NO. : 4,414,855
DATED : November 15, 1983
INVENTOR(S) : Shinichiro Iwasaki It is certified that error appears in the above-identified patent and that said Letters Patent is hereby corrected as shown below:

In Column 2, line 39, delete "inconsistancies" and insert --inconsistencies--.

In Column 4, line 34, please insert --present-- before "invention".

In Column 5, line 55, delete "ICI" and insert --ICl--.

In Column 5, line 60, delete "or" and insert --of--.

In Column 6, line 35, (equation), The second equation should be --5--. Please delete "4" and insert --5--.

In Column 8, line 22, delete "drive" and insert --driver--.

In Column 8, line 57, delete "wrapping" and insert --wrapped--.

Signed and Sealed this

Seventeenth Day of April 1984

[SEAL]

Attest:

GERALD J. MOSSINGHOFF

*Attesting Officer*  *Commissioner of Patents and Trademarks*